(No Model.) 3 Sheets—Sheet 1.

F. SCHWEDTMANN.
DYNAMO OR MOTOR.

No. 603,709. Patented May 10, 1898.

Witnesses
W. H. Alexander.
W. D. Coles

Inventor
F. Schwedtmann
By Attorneys (No Model.) 3 Sheets—Sheet 2.

F. SCHWEDTMANN.
DYNAMO OR MOTOR.

No. 603,709. Patented May 10, 1898.

Witnesses
W. H. Alexander
W. D. Coles

Inventor
F. Schwedtmann
By Attorneys (No Model.)  F. SCHWEDTMANN.  3 Sheets—Sheet 3.
DYNAMO OR MOTOR.

No. 603,709. Patented May 10, 1898.

Witnesses
W. H. Alexander.
W. D. Coles.

Inventor
F. Schwedtmann
By Attorneys

UNITED STATES PATENT OFFICE.

FERDINAND SCHWEDTMANN, OF ST. LOUIS, MISSOURI.

DYNAMO OR MOTOR.

SPECIFICATION forming part of Letters Patent No. 603,709, dated May 10, 1898.

Application filed October 23, 1897. Serial No. 656,143. (No model.)

*To all whom it may concern:*

Be it known that I, FERDINAND SCHWEDTMANN, a citizen of the United States, residing in the city of St. Louis, in the State of Missouri, have invented a certain new and useful Motor, of which the following is such a full, clear, and exact description as will enable any one skilled in the art to which it appertains to make and use the same, reference being had to the accompanying drawings, forming part of this specification.

The object of my invention is to produce a dynamo or motor having a laminated field-magnet core which will be neat in appearance, simple of construction, and durable.

My invention consists in a dynamo or motor having a metal casing cast in one piece, a laminated field-magnet core inserted in said casing from the bottom, and means of holding the field-magnet core in place, and in other novel features and details of construction, all of which are described in the following specification and pointed out in the claims affixed hereto.

Figure 1:
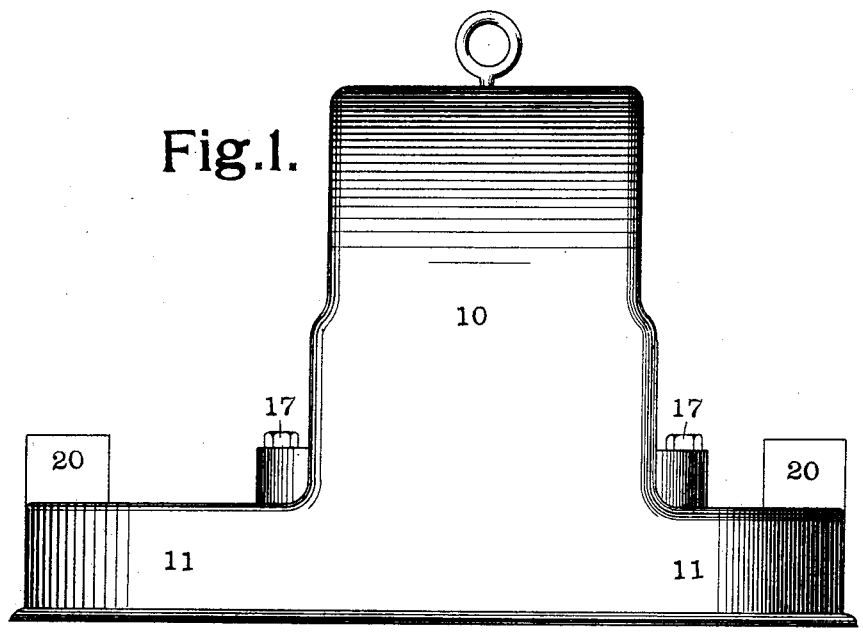
Figure 2:
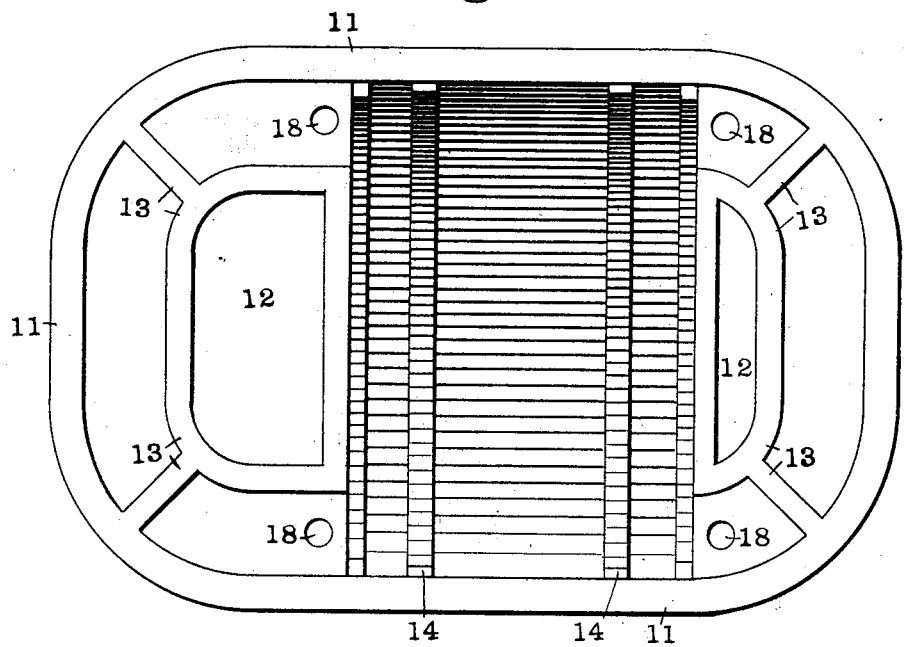
Figure 3:
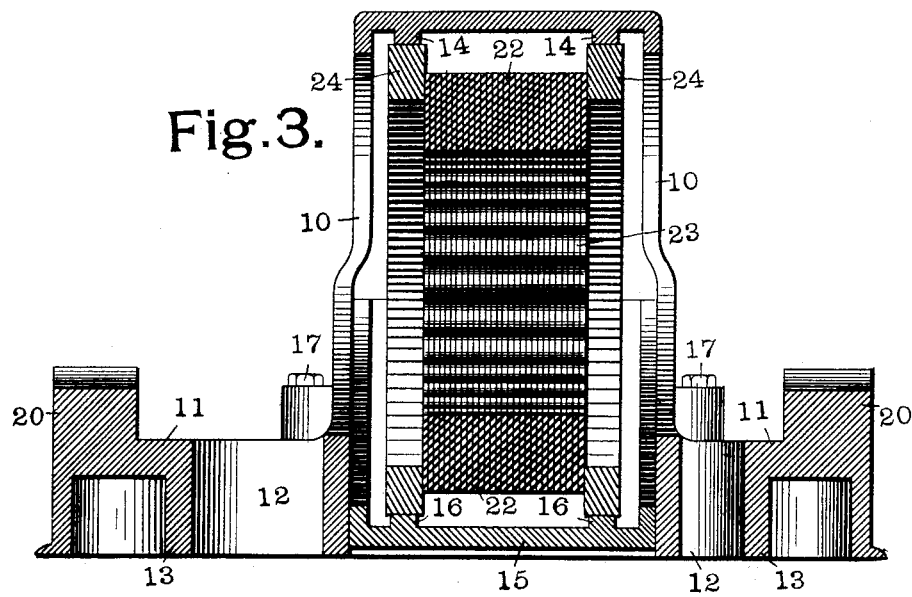
Figure 4:
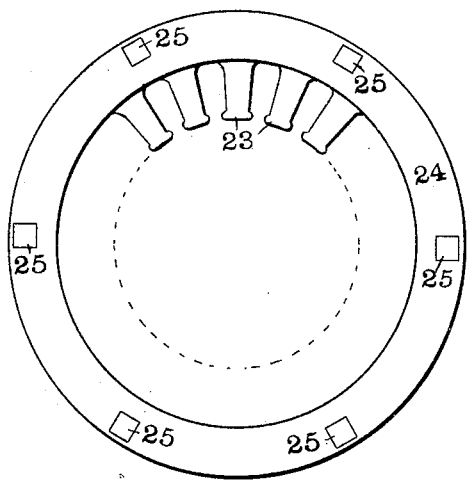
Figure 6:
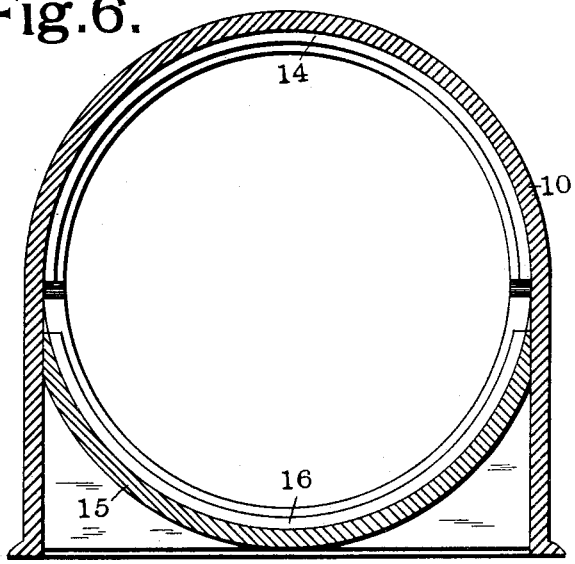
Figure 5:
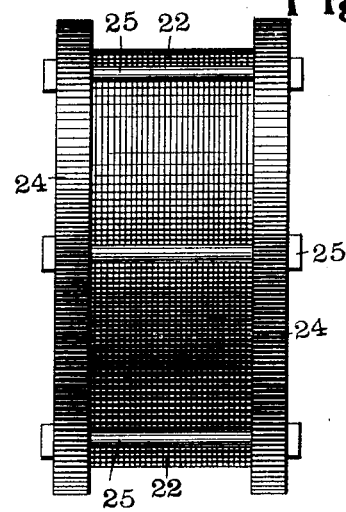
Figure 7:
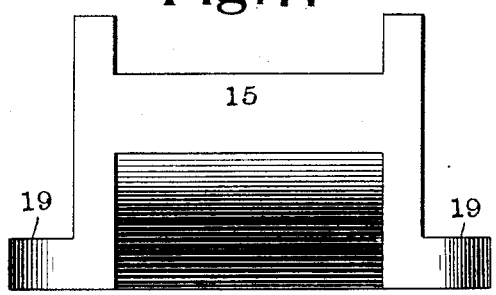

In the accompanying drawings, which illustrate a dynamo or motor made in accordance with my invention, Figure 1 is a side elevation. Fig. 2 is a bottom plan view, the field-magnet core and part holding it in place being removed. Fig. 3 is a vertical longitudinal section. Figs. 4 and 5 are an end and side elevation, respectively, of the field-magnet core. Fig. 6 is a vertical cross-section, the field-magnet core being removed; and Fig. 7 is an end elevation of the part holding the field-magnet core in position.

Like marks of reference refer to similar parts in the several views of the drawings.

10 is the casing or housing for the field-magnet core and is carried by and preferably cast integral with the base 11. In the base 11, at the ends of the casing 10, are openings 12. 13 are strengthening-flanges. On the interior of the casing 10 are two semi-annular ribs 14. Fitting within the lower half of the casing 10 is a core-retaining part 15, on which is formed two semi-annular ribs 16, similar to the ribs 14. The part 15 is held in position by bolts 17, which pass through openings 18 in the base 10 and into lugs 19 on the said part 15. On the base 11 are two standards 20, on which the bearings for the armature-shaft may be mounted.

22 is the laminated field-magnet core, which is provided with inwardly-projecting pole-pieces 23. The laminæ of the core 22 are held in place by rings 24, which are connected by bolts 25. The rings 24 are of such a size and distance apart as to fit within the annuli formed by the semi-annular ribs 14 and 16.

When the field-magnet core 22 is placed in position and the core-retaining part 15 secured in place by the bolts 17, said core 22 will be rigidly held in the casing. The machine has all the advantages of the ordinary laminated-core dynamo or motor and at the same time has the neat appearance and strength of a machine with a cast core.

I am aware that dynamos have been constructed heretofore having a laminated core held in a cast casing formed in two or more parts, which are bolted or otherwise secured together, and do not claim the same.

Having fully described my invention, what I claim as new, and desire to secure by Letters Patent of the United States, is—

1. In a dynamo or motor, a suitable casing or housing for the field-magnet core cast in one piece, a laminated field-magnet core inserted in said casing from the bottom, and means for rigidly securing said core in said casing.

2. In a dynamo or motor, a suitable casing or housing for the field-magnet core cast in one piece, a base formed integral with said casing, a laminated field-magnet core inserted in said casing from the bottom and means for rigidly securing said core in said casing.

3. In a dynamo or motor, a suitable casing for the field-magnet core cast in one piece, a laminated field-magnet core inserted in said casing from the bottom and a core-retaining member entering said casing and securing said core in position.

4. In a dynamo or motor, a suitable cast casing, a core-retaining member adapted to be secured in said casing, annular ribs on said casing and core-retaining member, a laminated field-magnet core, and annular members holding the laminæ of said core in position and adapted to make contact with said annular ribs.

5. In a dynamo or motor, a suitable casing cast in one piece, a core-retaining member adapted to be inserted in said casing from the bottom, annular ribs on said casing and core-retaining member, a laminated field-magnet core, and annular members holding the laminæ of said core in position and adapted to make contact with said annular ribs.

In testimony whereof I have hereunto set my hand and affixed my seal in the presence of the two subscribing witnesses.

FERDINAND SCHWEDTMANN. [L. S.]

Witnesses:
J. CLARENCE TAUSSIG,
W. A. ALEXANDER.